(12) United States Patent
Inoue (10) Patent No.: US 6,705,731 B2
(45) Date of Patent: Mar. 16, 2004

(54) PROJECTION TYPE DISPLAY APPARATUS

(75) Inventor: Kazuhiko Inoue, Suita (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/266,011

(22) Filed: Oct. 7, 2002

(65) Prior Publication Data

US 2003/0071974 A1 Apr. 17, 2003

(30) Foreign Application Priority Data

Oct. 11, 2001 (JP) ........................................ 2001-314371

(51) Int. Cl.⁷ ............................................... G03B 21/14
(52) U.S. Cl. ........................ 353/20; 359/495; 359/497; 362/19; 349/9
(58) Field of Search ................... 353/20, 487; 359/488, 359/495, 496, 498, 499, 500; 349/5, 9; 362/19

(56) References Cited

U.S. PATENT DOCUMENTS 5,808,795 A * 9/1998 Shimomura et al. ........ 359/488

FOREIGN PATENT DOCUMENTS

JP 2000-321662 A 11/2000
JP 2000-330196 A 11/2000

* cited by examiner

*Primary Examiner*—Russell Adams
*Assistant Examiner*—Michael Dalakis
(74) *Attorney, Agent, or Firm*—Sidley Austin Brown & Wood LLP (57) ABSTRACT

Disclosed is a projection type display apparatus comprising: a color light generator for generating primary color lights; three light valves for respectively modulating the primary color lights; a color synthesizer for synthesizing the primary color lights which have been modulated by the light valves, respectively; a plurality of pre-PBSs each of which is provided between the primary color light generator and the respective light valves and is for removing polarized component unnecessary for illumination of the respective light valve; a plurality of main PBSs each of which is provided at a position that is between the respective pre-PBS and the respective light valve and is between the respective light valve and the color synthesizer and is for removing polarized component unnecessary for illumination of the respective light valve and polarized component unnecessary for projection to the screen in the primary color light modulated by the respective light valve; and a plurality of post-PBSs each of which is provided between the respective main PBSs and the color synthesizer and is for removing polarized component unnecessary for projection to the screen in the respective primary color light modulated by the respective light valve.

10 Claims, 6 Drawing Sheets

PROJECTION TYPE DISPLAY APPARATUS

CROSS-REFERENCE TO RELATED APPLICATION(S)

This application is based on Japanese Patent Application No. 2001-314371 filed in Japan on Oct. 11, 2001, the entire content of which is hereby incorporated by reference.

BACKGROUND OF THE INVENTION

1. Field of the Invention

The present invention relates to a projection type display apparatus. For example, the present invention relates to the projection type display apparatus such as a liquid crystal projector for projecting and displaying a two-dimensional image of an illuminated liquid crystal panel onto a screen.

2. Description of the Related Art

Figure 6:
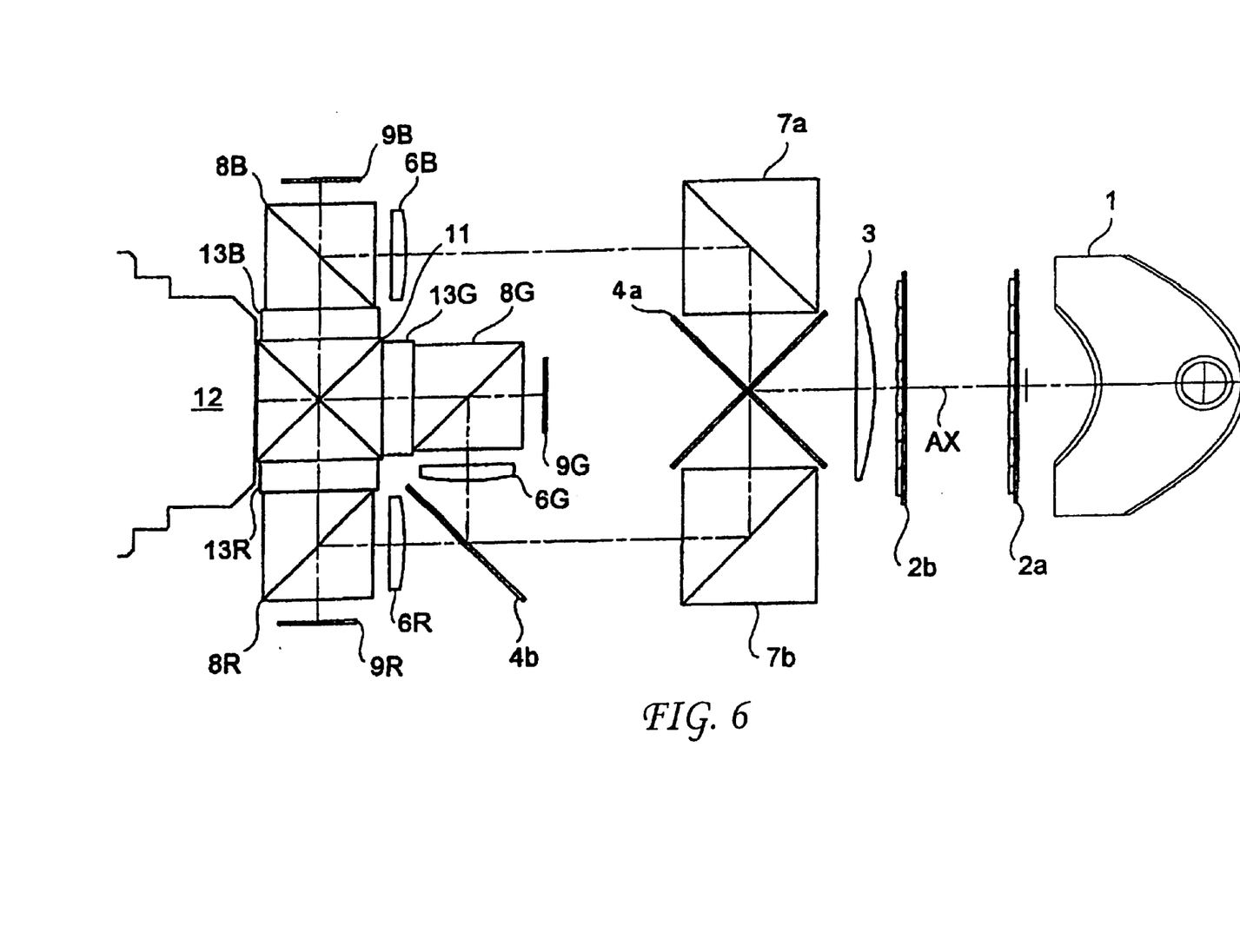
FIG. 6 is an optical structure diagram showing one example of a conventional projection type display apparatus.

A projection type display apparatus, which uses a plurality of polarizing beam splitters (PBS) for projection of an illumination to a light valve (for example, a liquid crystal panel) or a light that an image is modulated by the light valve, is conventionally known (for example, Japanese Unexamined Laid-Open Patent Publication Nos. 2000-330196, 2000-321662, etc.). Its schematic optical structure is shown in FIG. 6. In FIG. 6, the reference numeral (1) is a light source, (2a) is a first lens array, (2b) is a second lens array, (3) is a superimposing lens, (4a) is a first dichroic mirror, (4b) is a second dichroic mirror, (6R), (6G) and (6B) are field lenses, (7a) and (7b) are pre-polarizing beam splitters (pre-PBS), (8R), (8G) and (8B) are main polarizing beam splitters (main PBS), (9R), (9G) and (9B) are reflection type light valves (for example, reflection type liquid crystal panels), (11) is a cross dichroic prism, (12) is a projection lens, (13R), (13G) and (13B) are spacer glasses and AX is an optical axis.

A spatial energy distribution of a light emitted from the light source (1) is averaged by the first lens array (2a) and the second lens array (2b). Lights emitted from respective cells of the second lens array (2b) are superimposed on the light valves (9R), (9G) and (9B) by the superimposing lens (3). Meanwhile, a light emitted from the superimposing lens (3) is color-separated into lights of primary colors: red (R); green (G); and blue (B) corresponding to three primary colors by first and second dichroic mirrors (4a) and (4b).

The light of the primary color B is reflected by the first dichroic mirror (4a) and by the pre-PBS (7a), and passes through the field lens (6B). Meanwhile, the lights of the primary colors G and R are reflected by the first dichroic mirror (4a) and by the pre-PBS (7b), and are color-separated into G and R by the second dichroic mirror (4b). The light of the primary color G is reflected by the second dichroic mirror (4b), and passes through the field lens (6G). The light of the primary color R transmits through the second dichroic mirror (4b), and passes through the field lens (6R). Since polarizing directions of the lights entering the main PBSs (8R), (8G) and (8B) are previously adjusted by the reflection at the pre-PBSs (7a) and (7b), higher contrast can be obtained.

The field lenses (6R), (6G) and (6B) change the illumination light into a telecentric light flux and allow a projection light to enter a pupil of the projection lens (12) by the power of the light flux. The primary color lights of RGB which pass through the field lenses (6R), (6G) and (6B), respectively, enter the main PBSs (8R), (8G) and (8B). The main PBSs (8R), (8G) and (8B) allow polarized components (P polarized lights) which are not necessary for illuminations to the light valves (9R), (9G) and (9B) to transmit and remove polarized components, and allows only polarized components (S polarized lights) which are necessary for the illuminations to the light valves (9R), (9G) and (9B) to reflect and enter the light valves (9R), (9G) and (9B), respectively.

The respective light valves (9R), (9G) and (9B) modulate the primary color lights (S polarized lights), polarizing directions of which are aligned, by means of selective polarizing control according to display of pixels of a two-dimensional image (namely, ON/OFF for each pixel), and emit a reflected light composed of two kinds of polarized lights (P polarized light and S polarized light). The primary color lights emitted from the light valves (9R), (9G) and (9B) again enter the main PBSs (8R), (SG) and (8B), respectively. The main PBSs (8R), (8G) and (8B) reflect and remove a polarized component (S polarized light) which is unnecessary for projection and allow only a polarized component (P polarized light) which is necessary for projection to transmit and enter the spacer glasses (13R) (13G) and (13B).

The spacer glasses (13R) (13G) and (13B) are jointed to the main PBSs (8R), (8G) and (8B), respectively, and to the cross dichroic prism (11), and their gaps are kept stable and suitable so that shift of the pixels for the respective colors is prevented. The primary color lights which transmit through the spacer glasses (13R), (13G) and (13B), respectively, enter the cross dichroic prism (11) to be color-synthesized. The color-synthesized projection light in the cross dichroic prism (11) is projected onto a screen (not shown) by the projection lens (12).

The contrast which is generally obtained in the projection type display apparatus shown in FIG. 6 is determined by a relationship between an extinction ratio due the PBS system from the light source to the light valves (illumination side extinction ratio) and an extinction ratio due to the PBS system from the light valves to the screen (projection side extinction ratio). Concretely, an inferior value of both values determines the contrast of the projection type display apparatus. Therefore, in the case where the projection type display apparatus having high contrast is obtained, it is necessary that both the illumination side extinction ratio and the projection side extinction ratio show high values. Further, when the illumination side extinction ratio and the projection side extinction ratio are almost equivalent to each other, the projection type display apparatus having high contrast can be obtained most efficiently.

In addition, there are two kinds of methods, a method of taking out a necessary polarized light by means of transmission (the method using a P polarized light) and a method of taking out a necessary polarized light by means of reflection (the method using a S polarized light), in a PBS for determining the contrast of the projection type display apparatus. However, in the case of the method using the S polarized light, a high extinction ratio can not be secured with a single PBS. The reason for this will be explained below. When a transmittance of the P polarized light in PBS is Tp, a transmittance of the S polarized light is Ts, a reflectance of the S polarized light is Rs and a reflectance of the P polarized light is Rp, an extinction ratio in the case of using the P polarized light is obtained by Tp/Ts, and an extinction ratio in the case of using the S polarized light is obtained by Rs/Rp. According to PBS characteristics, since the transmittance Ts of the S polarized light can be very low, the extinction ratio Tp/Ts in the case of using the P polarized light can be high. However, since the reflectance Rp of the P polarized light cannot be as low as the transmittance Ts of the S polarized light, the extinction ratio Rs/Rp in the case of using the S polarized light is lowered.

In the projection type display apparatus shown in FIG. 6, since the illumination sides of the pre-PBSs (7a) and (7b) and the main PBSs (8R), (8G) and (8G) are used in the method of taking out a necessary polarized light by means of reflection, the high illumination side extinction ratio cannot be secured due to the above reason. Moreover, since the lights which have passed through the pre-PBSs (7a) and (7b) pass through the second dichroic mirror (4b) and the field lenses (6R), (6G) and (6B), a phase shift occurs at the time of transmission and reflection, so that a shift of the polarized light occurs. This becomes a factor which causes a drop of the illumination side extinction ratio.

Meanwhile, the projection side extinction ratio is determined by only one of the main PBSs (8R), (8G) and (8B). On the projection side, since the main PBSs (8R), (8G) and (8B) take out a necessary polarized light by means of transmission, a higher extinction ratio can be obtained in comparison with an extinction ratio on the illumination side. However, it is very difficult to obtain the high extinction ratio which is necessary to achieve the high contrast (not less than 1000:1) required for the recent projection type display apparatus by mean of one PBS. For example, unnecessary polarized light is absorbed and removed by arranging a polarizing plate (polarizing film or the like) on an optical path after the emission from the main PBSs (8R), (8G) and (8B), so that a high extinction ratio can be obtained. However, since heat, which is generated due to the absorption of the unnecessary polarized light, deteriorates a performance of the polarizing plate, high brightness cannot be obtained. Moreover, in order to improve the projection side extinction ratio, it is considered that the function for removing polarized light unnecessary for projection is given to the cross dichroic prism (11), but it is very difficult to produce a cross dichroic prism having the polarization separating function.

SUMMARY OF THE INVENTION

The present invention is devised in order to solve the above problems, and an object is to provide a projection type display apparatus having high brightness and high contrast.

In order to achieve the above object, a projection type display apparatus according to a first aspect of the present invention has light valves corresponding to plural primary colors, polarization separating means for polarizing and separating primary color lights for illuminating the light valves and primary color lights modulated by the light valves, and color synthesizing means for color-synthesizing primary color lights which are necessary for projection to a screen in the primary color lights emitted from the polarization separating means. The polarization separating means has pre-polarizing beam splitters having a function for removing polarized components which are unnecessary for illumination of the light valves, main polarizing beam splitters having a function for removing polarized components which are unnecessary for illumination of the light valves and polarized components which are unnecessary for projection to the screen in the primary color lights modulated by the light valves, and post-polarizing beam splitters having a function for removing polarized components which are unnecessary for projection to the screen in the primary color lights modulated by the light valves which are arranged in this order on an optical path for the respective primary color lights.

In addition, in the projection type display apparatus according to a second aspect of the present invention in the structure of the first invention, an optical part which causes a shift of polarized lights is not provided between the pre-polarizing beam splitters and the main polarizing beam splitters and between the main polarizing beam splitters and the post-polarizing beam splitters.

Further, in the projection type display apparatus according to a third aspect of the present invention, in the structure of the first and second aspects, the pre-polarizing beam splitters have two polarizing separation surfaces and the two surfaces are almost symmetrical with planes of incidence of the main polarizing beam splitters including an optical axis.

In the projection type display apparatus according to a fourth aspect of the present invention, in the structures of the first, second and third aspects, the pre-polarizing beam splitters and the post-polarizing beam splitters take out the polarized components necessary for the illumination and projection by means of transmission, and the pre-polarizing beam splitter and the post-polarizing beam splitter which are used for the same primary color light have the almost equivalent extinction ratio.

In the projection type display apparatus according to a fifth aspect of the present invention, in the structure of the fourth aspect, in the main polarizing beam splitters, an extinction ratio when a necessary polarized component is taken out by reflection is almost equivalent to an extinction ratio when a necessary polarized component is taken out by transmission.

BRIEF DESCRIPTION OF THE DRAWINGS

These and other objects, advantages and features of the invention will become apparent from the following description thereof taken in conjunction with the accompanying drawings, in which.

DETAILED DESCRIPTION OF THE PREFERRED EMBODIMENTS

There will be explained below a projection type display apparatus on which the present invention is carried out with reference to the drawings. Here, the same reference numerals are given to the portions in embodiments which are the same as or correspond to those in the above-mentioned conventional example (FIG. 6), and the overlapped explanation is omitted suitably.

Figure 1:
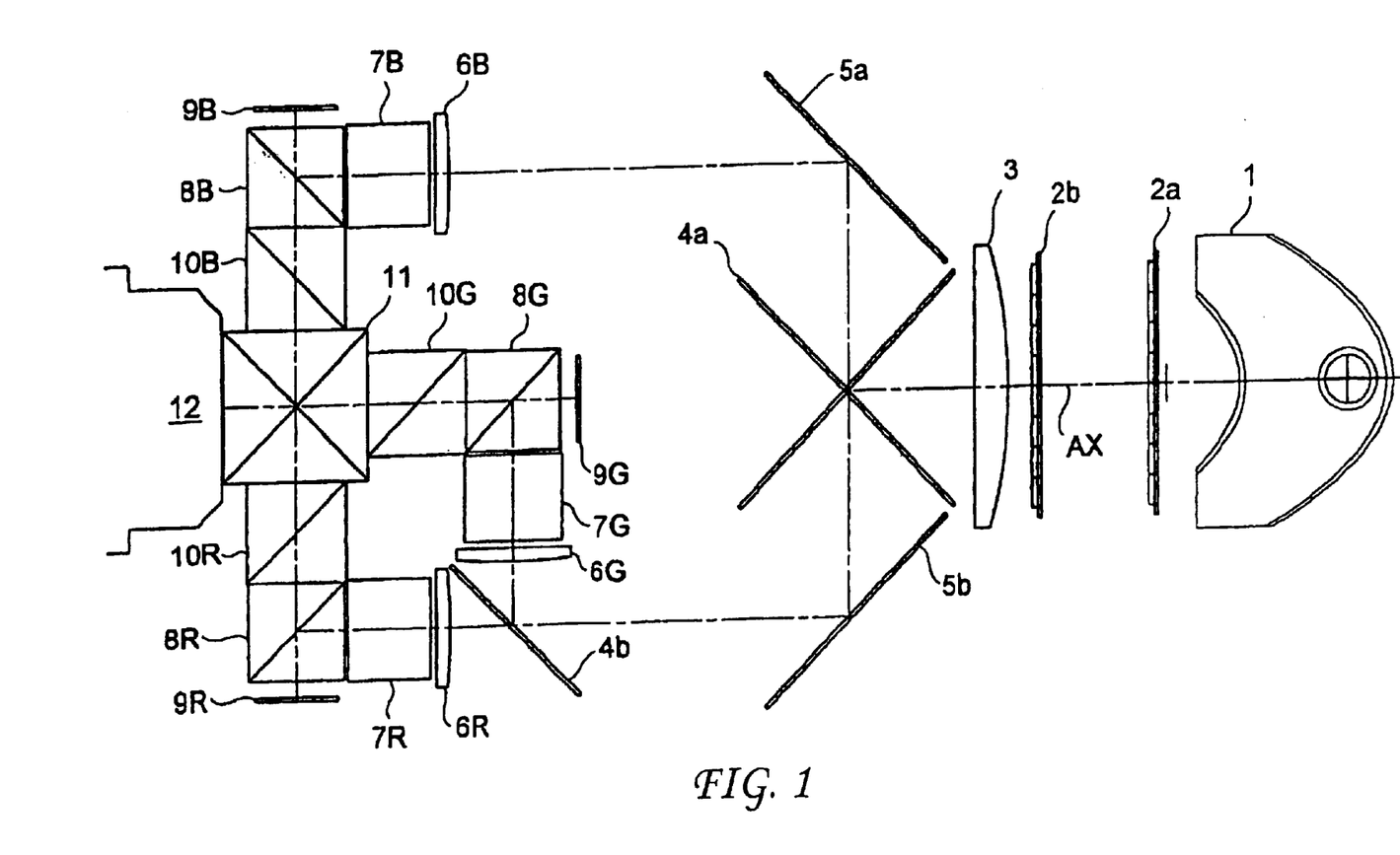
FIG. 1 is an optical structure diagram showing one embodiment of a projection type display apparatus.

FIG. 1 shows a schematic optical structure of the entire projection type display apparatus of the present invention. The projection type display apparatus is composed of a light source (1), a first lens array (2a), a second lens array (2b), a superimposing lens (3), a first dichroic mirror (4a), a second dichroic mirror (4b), reflection mirrors (5a) and 5(b), field lenses (6R), (6G) and (6B), pre-polarizing beam splitters (pre-PBSs (7R), (7G) and (7B)), main polarizing beam splitters (main PBSs (8R), (8G) and (8B)), reflection type light valves (for example, reflection type liquid crystal panels (9R) (9G) and (9B)), post-polarizing beam splitters (post-PBSs (10R), (10G) and (10B)), a cross dichroic prism (11), a projection lens (12) and the like.

A spatial energy distribution of a light emitted from the light source (1) is averaged by the first lens array (2a) and the second lens array (2b). Lights emitted from cells of the second lens array (2b) are superimposed on the light valves (9R), (9G) and (9B) by the superimposing lens (3). Meanwhile, the light emitted from the superimposing lens (3) is color-separated into lights of primary colors: red (R); green (G); and blue (B) corresponding to three primary colors by the first and second dichroic mirrors (4a) and (4b). Here, in order to improve a use efficiency of the light from the light source (1), polarization converting means for aligning polarizing directions of the light may be arranged if the need arises.

The light of the primary color B is reflected by the first dichroic mirror (4a) and by the reflection mirror (5a), and passes through the field lens (6B). Meanwhile, the lights of the primary colors G and R are reflected by the first dichroic mirror (4a) and by the reflection mirror (5b), and are color-separated into G and R by the second dichroic mirror (4b). The light of the primary color G is reflected by the second dichroic mirror (4b), and passes through the field lens (6G). The light of the primary color R transmits through the second dichroic mirror (4b) and passes through the field lens (6R).

The field lenses (6R), (6G) and (6B) change illumination lights into a telecentric light flux and allow a projection light to enter a pupil of the projection lens (12) by means of its power. The lights of the primary colors RGB which have passed through the field lenses (6R), (6G) and (6B), respectively, enter the pre-PBSs (7R), (7G) and (7B), respectively. The pre-PBSs (7R), (7G) and (7B) reflect and remove polarized components (S polarized lights) which are unnecessary for illumination to the light valves (9R), (9G) and (9B), and allow only polarized components (P polarized lights) which are necessary for illumination to the light valves (9R), (9G) and (9B) to transmit and enter the main PBSs (8R), (8G) and (8B). The main PBSs (8R), (8G) and (8B) transmit and remove polarized components (P polarized lights) which are unnecessary for illumination to the light valves (9R), (9G) and (9B), and allow only polarized components (S polarized lights) which are necessary for illumination to the light valves (9R), (9G) and (9B) to reflect and enter the light valves (9R), (9G) and (9B).

The light valves (9R), (9G) and (9B) modulate the primary color lights (S polarized lights), the polarizing directions of which are aligned, by means of selective polarizing control according to display of the pixels of a two-dimensional image (namely, ON/OFF for each pixel), and emit a reflected light composed of two kinds of polarized lights (P polarized light and S polarized light). The primary color lights emitted from the light valves (9R), (9G) and (9B) again enter the main PBSs (8R), (8G) and (8B), respectively. The main PBSs (8R), (8G) and (8B) reflect and remove polarized components (S polarized lights) which are unnecessary for projection, and allow only polarized components (P polarized lights) which are necessary for projection to transmit and enter the post-PBSs (10R), (10G) and (10B).

The post-PBSs (10R), (10G) and (10B) reflect and remove polarized components (S polarized lights) which are unnecessary for projection similarly to the main PBSs (8R), (8G) and (8B), and allow only polarized components (P polarized lights) which are necessary for projection to transmit therethrough. The primary color lights, which have transmitted through the post-PBSs (10R), (10G) and (10B), enter the cross dichroic prism (11) and are color-synthesized. The projection light, which has been color-synthesized by the cross dichroic prism (11), is projected to the screen (not shown) by the projection lens (12). Here, the order and arrangement of RGB in the color separation and color synthesizing can be easily changed by changing not only the projection type display apparatus but also the characteristics of the respective optical parts.

Figure 2A:
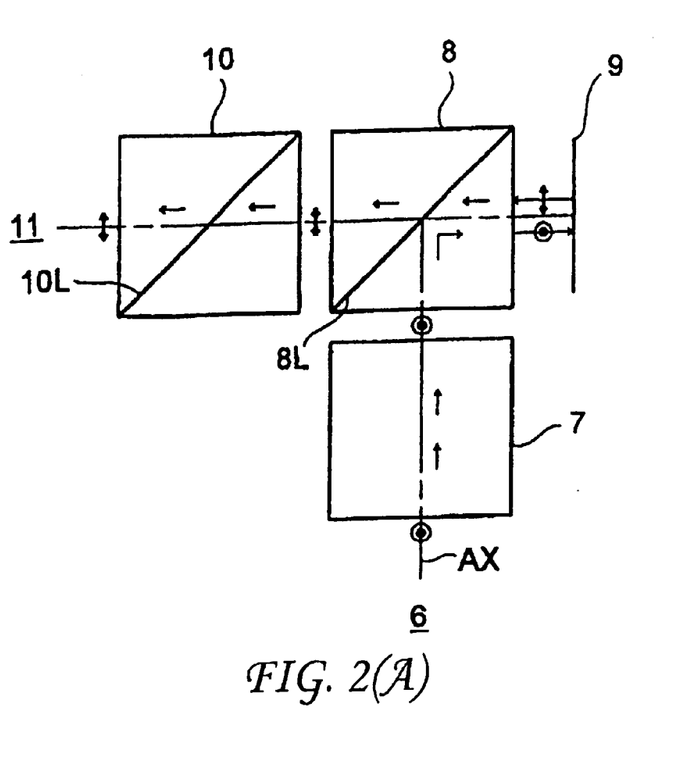
FIGS. 2(A) and 2(B) are schematic diagrams showing a PBS system arrangement in the projection type display apparatus of FIG. 1.
Figure 2B:
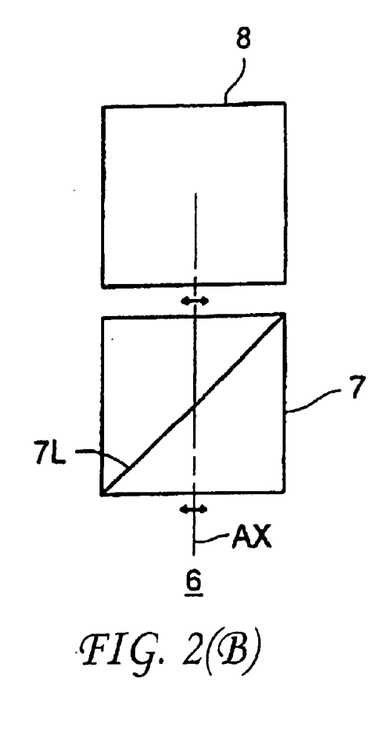

The functions of the PBS system which carry out the polarizing separation of the primary color lights (RGB) for illuminating the light valves (9R), (9G) and (9B) and the polarizing separation of the primary color lights (RGB) modulated by the light valves (9R), (9G) and (9B) will be further detailed with reference to FIGS. 2(A) and 2(B). FIGS. 2(A) and 2(B) representatively show elements corresponding to the lights of the primary colors RGB. Reference numeral (6) is field lenses (6R), (6G) and (6B), (7) is pre-PBSs (7R), (7G) and (7B), (8) is main PBSs (8R), (8G) and (8B), (9) is light valves (9R), (9G) and (9B), and (10) is post-PBSs (10R), (10G) and (10B). Moreover, (7L), (8L) and (10L) are polarizing separation surfaces of the pre-PBS (7), the main PBS (8) and the post PBS (10), respectively.

FIG. 2(A) shows an arrangement of the PBS system viewed from a front surface side, and a surface parallel with the sheet surface is planes of incidence of the main PBS (8) and the post-PBS (10). Moreover, FIG. 2(B) shows an arrangement of the PBS system viewed from a side surface side {the light valve (9) is not shown}, and a surface parallel with the sheet surface is plane of incidence of the pre-PBS (7). Here, in order to clarify the polarizing state, a gap between the main PBS (8) and the post-PBS (10) is separated.

A polarized component which is unnecessary for illumination to the light valve (9) is removed from a light which has passed through the field lens (6) in the pre-PBS (7) and the main PBS (8), and only a polarized component which is necessary for the illumination to the light valve (9) reaches the light valve (9). Here, a component which vibrates vertically to the plane of incidence of the main PBS (8) {S polarized light with respect to the main PBS (8)} becomes the polarized component which is necessary for the illumination to the light valve (9). Due to the above-mentioned reason, it is preferable that the polarized component in this direction is taken out to be utilized by transmission in order to obtain high extinction ratio. For this reason, the plane of incidence of the pre-PBS (7) is rotated from the plane of incidence of the main PBS (8) by almost 90° with respect to the optical axis (AX).

Since the polarizing direction of the light entering the main PBS (8) is previously adjusted due to the transmission through the polarizing separation surface (7L) of the pre-PBS (7), higher contrast is obtained. Since the main PBS (8) takes out the polarized component which is necessary for the illumination to the light valve (9) by means of reflection, a high extinction ratio cannot be obtained by single main PBS (8). However, since the pre-PBS (7) which uses the polarized component necessary for the illumination to the light valve (9) as a transmitted light is arranged just before the main PBS (8), a high extinction ratio on the illumination side can be obtained. Furthermore, since an optical part (lens, mirror or the like) which causes a shift of a polarized light is not provided between the pre-PBS (7) and the main PBS (8), a shift of the polarizing state of an illumination light does not occur. Therefore, a high illumination side extinction ratio can be secured effectively.

A polarized component which is not necessary for projection to the screen is removed from a light which has been modulated and reflected by the light valve (9) in the main PBS (8) and the post PBS (10), and only a polarized component which is necessary for the projection to the screen reaches the cross dichroic prism (11). Here, a component which vibrates parallel with the plane of incidence of the main PBS (8) {a P polarized light with respect to the main PBS (8)} becomes the polarized component which is necessary for the projection to the screen. Due to the above reason, it is preferable that a polarized component in this direction is taken out by means of the transmission and is utilized in order to obtain a high extinction ratio. For this reason, the plane of incidence of the post-PBS (10) is flush with the plane of incidence of the main PBS (namely, parallel with each other).

In the PBS system which is composed of three kinds of the pre-PBS (7), the main PBS (8) and the post-PBS (10) arranged in this order on the optical path of the primary color lights (RGB), the pre-PBS (7) has a function for removing a polarized component unnecessary for the illumination to the light valve (9), and the post-PBS (10) has a function for removing a polarized component unnecessary for the projection in the primary color lights modulated by the light valve (9) to the screen. For this reason, high contrast (not less than 1000:1) can be achieved by the obtained high extinction ratio. In the pre-PBS (7) and the post-PBS (10), since the polarized components unnecessary for the illumination and the projection is taken out and utilized by means of the transmission, higher contrast can be achieved by the obtained extinction ratio. Moreover, since the PBSs (7, 8 and 10) do not remove polarized component unnecessary for the illumination and projection by means of absorption, heat which is generated by absorbing unnecessary polarized components does not deteriorate the performance, and thus high brightness can be achieved.

Further, on the projection side, since the main PBS (8) also takes out the unnecessary polarized component by means of transmission, a projection side extinction ratio higher than an illumination side extinction ratio can be obtained. However, as mentioned above, since the contrast of the projection type display apparatus is determined by an inferior one of the illumination side extinction ratio and the projection side extinction ratio, accordingly the projection side extinction ratio is wasted. Therefore, the PBS system is constituted so that the illumination side extinction ratio determined by the pre-PBS (7) and the main PBS (8) is almost equivalent to the projection side extinction ratio determined by the main PBS (8) and the post-PBS (10).

In order that the illumination side extinction ratio is made to be almost equivalent to the projection side extinction ratio, it is desirable that the pre-PBS (7) and the post-PBS (10) which are used for the same primary color lights have the almost equivalent extinction ratios (for example, about 600:1). This can be realized by, for example, the same coating design of the film characteristics of the polarizing separation surfaces (7L and 10L) and by using the pre-PBS (7) and the post-PBS (10) having the equivalent performances. It is further desirable that the illumination side extinction ratio of the main PBS (8) (an extinction ratio when a necessary polarized component is taken out by reflection) is almost equivalent to the projection side extinction ratio (an extinction ratio when a necessary polarized component is taken out by transmission). This can be realized, for example, in a manner that the projection side extinction ratio (Tp/Ts) is lowered so that the illumination side extinction ratio (Rs/Rp) is risen and the film characteristics of the polarizing separation surface (8L) are almost equivalent on the illumination side and the projection side.

That the extinction ratio of the pre-PBS (7) is almost equivalent to the extinction ratio of the post-PBS (10) and the extinction ratios of the main PBS (8) are almost equivalent on the illumination side and the projection side is determined by taking actual scattering of manufacturing, measurement scattering and the like into consideration. Concretely, it is desirable that the following conditional equations (1) and (2) are satisfied. Namely, it is desirable that a larger extinction ratio is within 20 times as large as a smaller extinction ratio and more desirably within 10 times. When the illumination side extinction ratio is made to be almost equivalent to the projection side extinction ratio (for example, the same-level order) by satisfying such a condition, the extinction ratios are not wasted and are efficient. Therefore, the high brightness and contrast can be obtained effectively.

$$0.05 < \frac{\text{extinction ratio of pre-}PBS}{\text{extinction ratio of post-}PBS} < 20 \quad (1)$$

$$0.05 < \frac{\text{illumination side extinction ratio of main }PBS}{\text{projection side extention ratio of main }PBS} < 20 \quad (2)$$

On the projection side, since an optical part (lens, mirror or the like) which causes a shift of a polarized light is not provided between the main PBS (8) and the post-PBS (10), a shift of the polarizing state of a projected light does not occur. Therefore, high projection side extinction ratio can be secured more effectively. Moreover, as shown in FIG. 1, when the main PBS (8), the post-PBS (10) and the cross dichroic prism (11) are jointed, their intervals are kept stable and suitable. For this reason, the shift of pixels for the respective colors can be prevented. Namely, the above-mentioned embodiment includes the projection type display apparatus in which the main PBSs for the respective colors, the post-PBSs for the respective colors and the cross dichroic prism are jointed.

Figure 3:
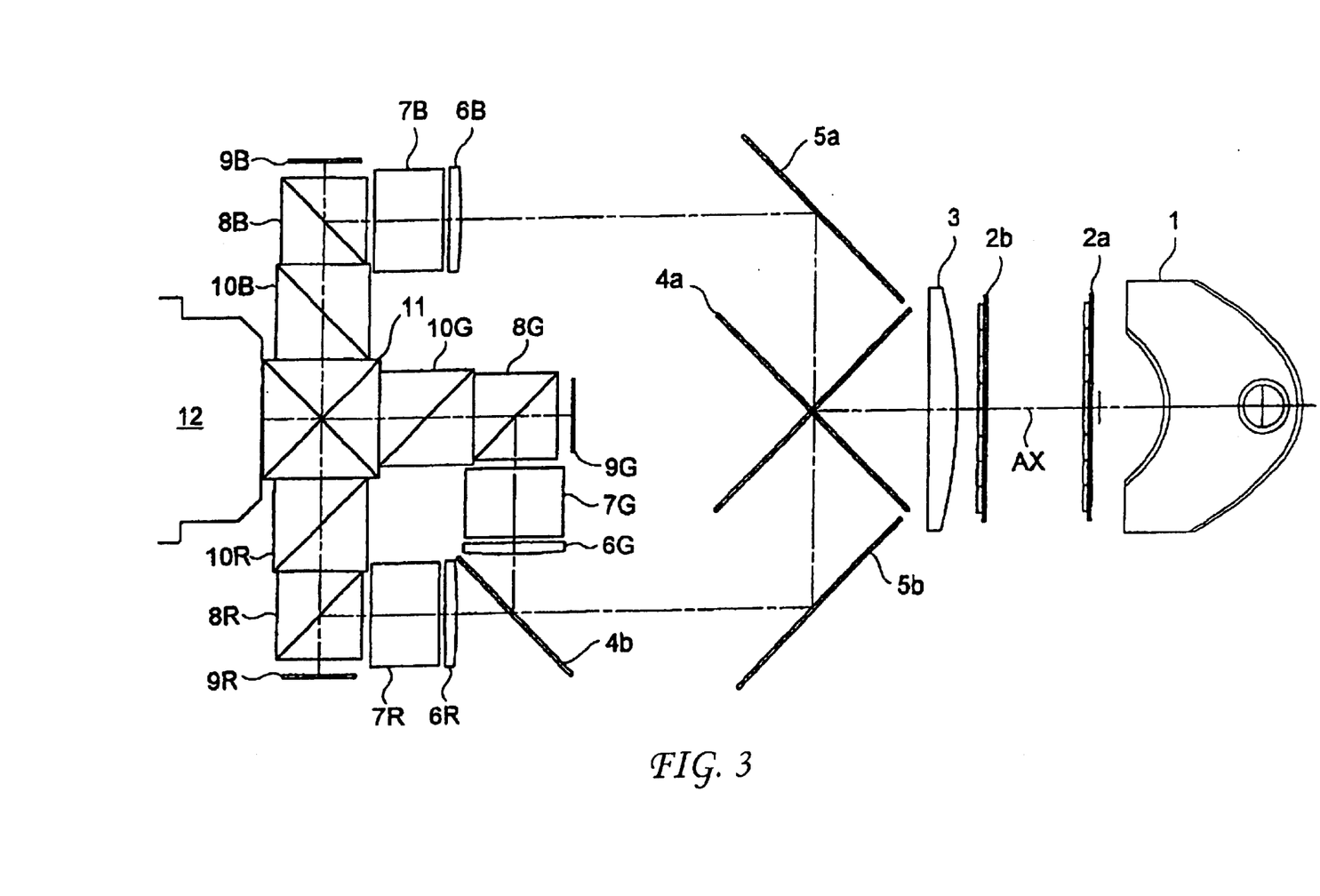
FIG. 3 is an optical structure diagram showing another embodiment of the projection type display apparatus.
Figure 4A:
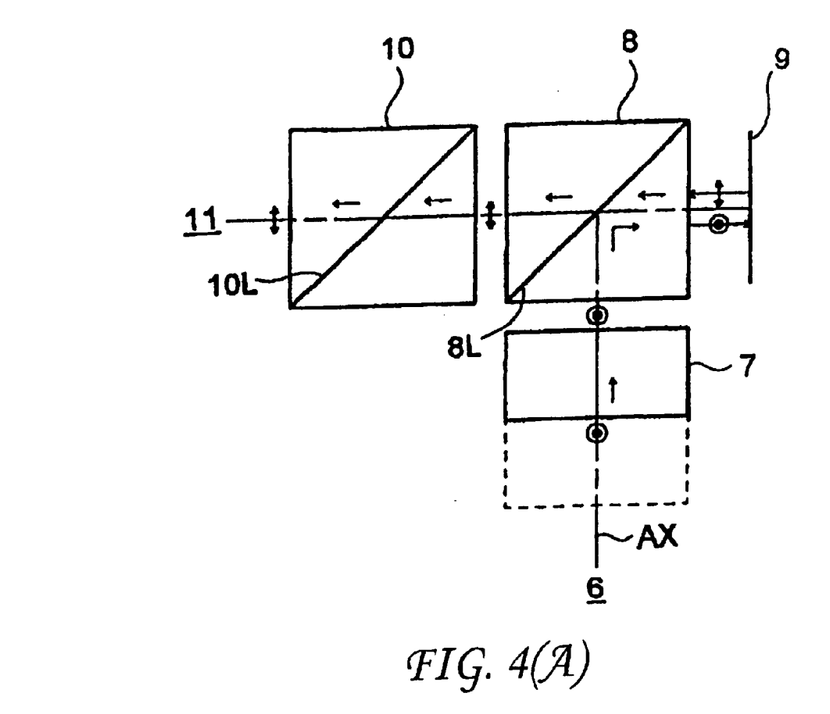
FIGS. 4(A) and 4(B) are schematic diagrams showing a PBS system arrangement in the projection type display apparatus of FIG. 3.
Figure 4B:
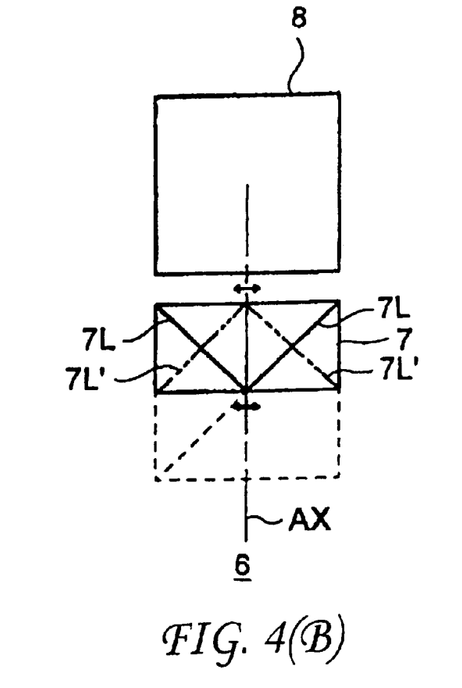

FIG. 3 shows a schematic optical structure according to another embodiment of the projection type display apparatus in the same form as that of FIG. 1. Moreover, FIG. 4 shows an arrangement of the PBS system used in the display apparatus of FIG. 3 in the same form as that of FIG. 2. The display apparatus shown in FIGS. 3 and 4 is greatly characterized by the pre-PBSs (7) ((7R, (7G) and (7B)), and as shown in FIG. 4(B), the pre-PBS (7) has two polarizing separation surfaces (7L), and the two surfaces (7L) are almost (substantially) symmetrical with the plane of incidence of the main PBS (8) including the optical axis (AX). The other structure and function of the optical parts are the same as those of the display apparatus (FIGS. 1 and 2) described above, and the effect obtained by the structure and function are also the same as the effect of the display apparatus shown in FIGS. 1 and 2.

As shown in FIG. 4(B), in the pre-PBS (7) of this display apparatus, the polarizing separation surface (7L) is formed in a direction where a polarized component (S polarized light) which is not necessary for illumination is reflected to the PBS system, but the direction may be opposite. Namely, like the two polarizing separation surfaces (7L') shown by alternate long and two short dashes lines in FIG. 4(B), the polarizing separation surfaces (7L') may be formed in a direction where the polarized component (S polarized light) unnecessary for illumination is reflected into the prism of the pre-PBS (7). In this case, the polarized component (S polarized light) unnecessary for illumination is reflected by the two polarizing separation surfaces (7L') of the pre-PBS (7) to be returned to the direction of the light source (1, FIG. 3).

Figure 5A:
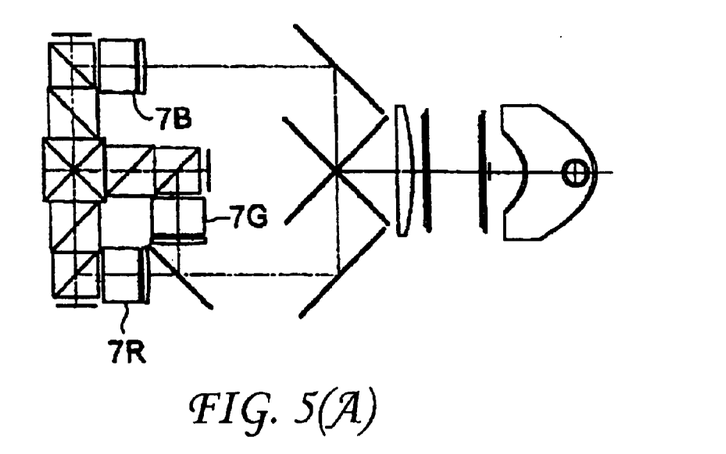
FIGS. 5(A) and 5(B) are optical structure diagrams showing a difference between a size of the embodiment of FIG. 1 (FIG. 5B) and a size of the embodiment in FIG. 3 (FIG. 5(A)) in the case where extents from a light valve to an illumination light flux are the same.
Figure 5B:
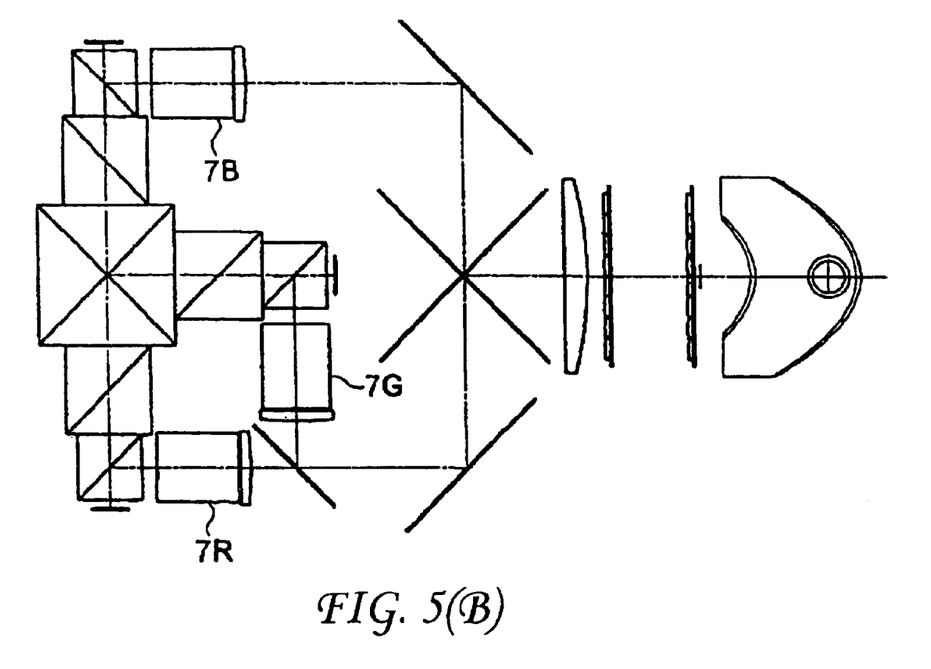

It is very effective in the projection type display apparatus where an extent of a illumination light flux is made to be large in order to obtain high brightness that the pre-PBS (7) ((7R), (7G) and (7B)) having the polarizing separation surfaces (7L or 7L') is used like the present embodiment. When the display apparatus of FIG. 1 and the display apparatus of FIG. 3 are constituted so that the extents of the light flux in the light valve (9) are the same, the former apparatus has a size shown in FIG. 5(B), but the latter apparatus is entirely miniaturized because a length in the direction of the optical path is shortened as shown in FIG. 5(A). Namely, the pre-PBS (7) ((7R), (7G) and (7B)) having the polarizing separation surfaces (7L or 7L') is used, so that the entire display apparatus can be miniaturized even with the same brightness.

As explained above, according to the present invention, since three kinds of polarizing beam splitters (pre, main and post) are used so that the polarized light is separated effectively, the projection type display apparatus with high brightness and high contrast can be realized.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A projection type display apparatus for projecting an image onto a screen, said projection type display apparatus comprising:

a plurality of light valves corresponding to a plurality of primary colors;

a polarizing/separating element for polarizing and separating primary color lights for illuminating the light valves and primary color lights modulated by the light valves; and a color synthesizing element for color-synthesizing primary color lights which are necessary for projection to a screen in the primary color lights emitted from the polarizing/separating element, wherein the polarizing/separating element comprises, for each of the primary colors, a pre-polarizing beam splitter, a main polarizing beam splitter, and a post-polarizing beam splitter in this order on an optical path of the respective primary color light, said pre-polarizing beam splitter having a function for removing polarized component which is unnecessary for illumination of the respective light valve, said main polarizing beam splitter having a function for removing polarized component which is unnecessary for illumination of the respective light valve and polarized component which is unnecessary for projection to the screen in the primary color light modulated by the respective light valve, and said post-polarizing beam splitter having a function for removing polarized component which is unnecessary for projection to the screen in the primary color light modulated by the respective light valve wherein the pre-polarizing beam splitters and the post-polarizing beam splitters take out the polarized components necessary for the illumination and projection by means of transmission, and the pre-polarizing beam splitter and the post-polarizing beam splitter which are used for the same primary color light have the almost equivalent extinction ratio, and wherein, in each of the main polarizing beam splitters, an extinction ratio when a necessary polarized component is taken out by reflection is almost equivalent to an extinction ratio when a necessary polarized component is taken out by transmission.

2. A projection type display apparatus as claimed in claim 1, wherein, on each of the optical paths of the primary color lights, no optical element which causes a shift of polarized lights is provided between the respective pre-polarizing beam splitter and the respective main polarizing beam splitter and between the respective main polarizing beam splitter and the respective post-polarizing beam splitter.

3. A projection type display apparatus as claimed in claim 1, each of the pre-polarizing beam splitters has two polarizing separation surfaces which are substantially symmetrical with an incident plane of the respective main polarizing beam splitter including an optical axis thereof.

4. A projection optical system used in a projection type color display apparatus for projecting an image onto a screen, said projection optical system comprising:

a plurality of light valves corresponding to a plurality of primary colors;

a polarizing/separating element for polarizing and separating primary color lights for illuminating the light valves and primary color lights modulated by the light valves; and a color synthesizing element for color-synthesizing primary color lights which are necessary for projection to a screen in the primary color lights emitted from the polarizing/separating element, wherein the polarizing/separating element comprises, for each of the primary colors, a pre-polarizing beam splitter, a main polarizing beam splitter, and a post-polarizing beam splitter in this order on an optical path of the respective primary color light, said pre-polarizing beam splitter having a function for removing polarized component which is unnecessary for illumination of the respective light valve, said main polarizing beam splitter having a function for removing polarized component which is unnecessary for illumination of the respective light valve and polarized component which is unnecessary for projection to the screen in the primary color light modulated by the respective light valve, and said post-polarizing beam splitter having a function for removing polarized component which is unnecessary for projection to the screen in the primary color light modulated by the respective light valve wherein the pre-polarizing beam splitters and the post-polarizing beam splitters take out the polarized components necessary for the illumination and projection by means of transmission, and the pre-polarizing beam splitter and the post-polarizing beam splitter which are used for the same primary color light have the almost equivalent extinction ratio; and wherein, in each of the main polarizing beam splitters, an extinction ratio when a necessary polarized component is taken out by reflection is almost equivalent to an extinction ratio when a necessary polarized component is taken out by transmission.

5. A projection optical system as claimed in claim 4, wherein, on each of the optical paths of the primary color lights, no optical element which causes a shift of polarized lights is provided between the respective pre-polarizing beam splitter and the respective main polarizing beam splitter and between the respective main polarizing beam splitter and the respective post-polarizing beam splitter.

6. A projection optical system as claimed in claim 4, each of the pre-polarizing beam splitters has two polarizing separation surfaces which are substantially symmetrical with an incident plane of the respective main polarizing beam splitter including an optical axis thereof.

7. A projection type display apparatus for projecting a color image onto a screen, said projection type display apparatus comprising:

a color light generator for generating a plurality of primary color lights;

a plurality of light valves respectively corresponding to the primary color lights, each of the light valves being for modulating the respective primary color light;

a color synthesizer for synthesizing the primary color lights each of which has been modulated by the respective light valve;

a plurality of pre-polarizing beam splitters respectively corresponding to the primary color lights, each of the pre-polarizing beam splitters being provided between the primary color light generator and the respective light valves and for removing a polarized component of the respective primary color light which is unnecessary for illumination of the respective light valve;

a plurality of main polarizing beam splitters respectively corresponding to the primary color lights, each of the main polarizing beam splitters being provided at a position that is between the respective pre-polarizing beam splitter and the respective light valve and is between the respective light valve and the color synthesizer, each of the main polarizing beam splitters being for removing a polarized component which is unnecessary for illumination of the respective light valve and a polarized component which is unnecessary for projection to the screen in the primary color light modulated by the respective light valve; and a plurality of post-polarizing beam splitters respectively corresponding to the primary color lights, each of the post-polarizing beam splitters being provided between the respective main polarizing beam splitters and the color synthesizer and being for removing a polarized component which is unnecessary for projection to the screen in the respective primary color light modulated by the respective light valve wherein the pre-polarizing beam splitters and the post-polarizing beam splitters take out the polarized components necessary for the illumination and projection by means of transmission, and the pre-polarizing beam splitter and the post-polarizing beam splitter which are used for the same primary color light have the almost equivalent extinction ratio, and wherein, in each of the main polarizing beam splitters, an extinction ratio when a necessary polarized component is taken out by reflection is almost equivalent to an extinction ratio when a necessary polarized component is taken out by transmission.

8. A projection type display apparatus as claimed in claim 7, wherein, for each primary color light, no optical element which causes a shift of polarized lights is provided between the respective pre-polarizing beam splitter and the respective main polarizing beam splitter and between the respective main polarizing beam splitter and the respective post-polarizing beam splitter.

9. A projection type display apparatus as claimed in claim 7, each of the pre-polarizing beam splitters has two polarizing separation surfaces which are substantially symmetrical with an incident plane of the respective main polarizing beam splitter including an optical axis thereof.

10. A projection type display apparatus as claimed in claim 7, wherein each of the light valves comprises a reflection type liquid crystal panel.

* * * * *